2,728,702

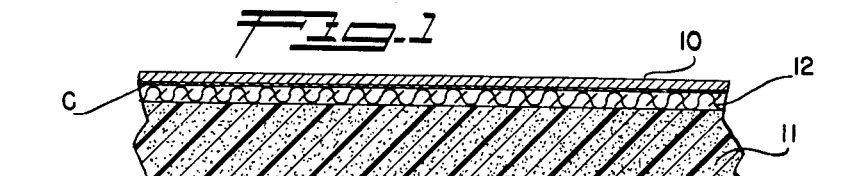
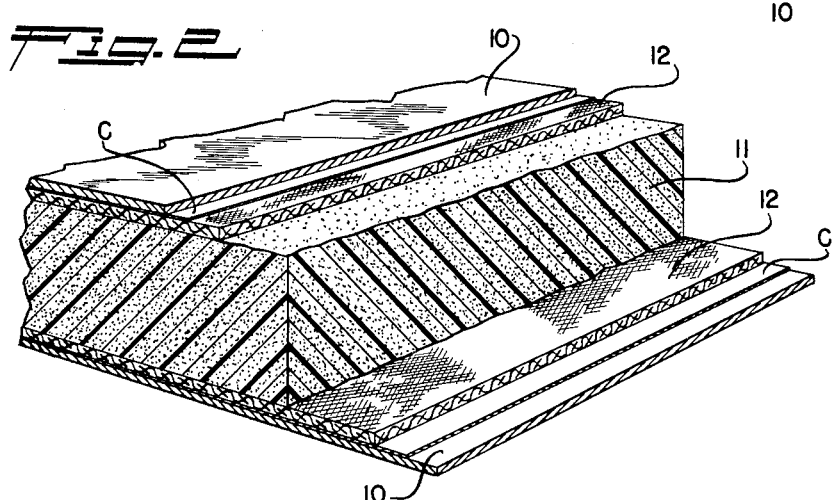
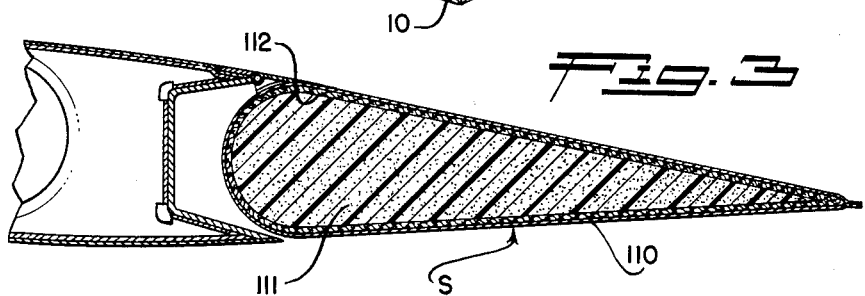
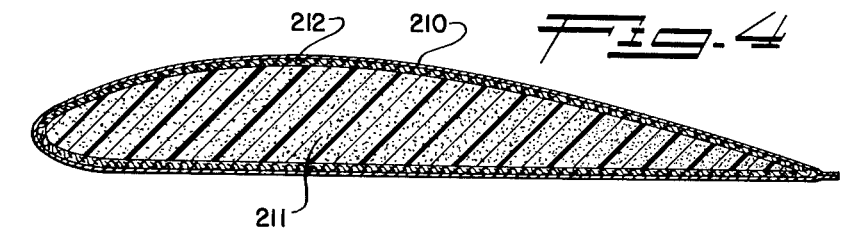
INVENTORS
ELI SIMON
FRANK W. THOMAS
LLOYD A. DIXON JR.
BY *George C Sullivan*
Agent

United States Patent Office 2,728,702
Patented Dec. 27, 1955

COMPOSITE CELLULAR PLASTIC STRUCTURE

Eli Simon, Los Angeles, Frank W. Thomas, Burbank, and Lloyd A. Dixon, Jr., Los Angeles, Calif., assignors to Lockheed Aircraft Corporation, Burbank, Calif.

Application July 13, 1951, Serial No. 236,518

4 Claims. (Cl. 154—83)

This invention relates to structures, devices, or parts, which incorporate cellular plastic materials as structural layers or cores and relates more particularly to improved devices, structures, or parts of this nature having increased strength.

Cellular plastics, such as foamed alkyd resin-polyisocyanate plastics, foamed phenolic plastics, etc. are now employed as internal materials or fillers, as layers or laminations in sandwich type assemblies, and in like situations. These foamed or cellular materials have numerous applications and will undoubtedly go into more extensive use as they may be easily poured in place or otherwise applied as a liquid or semi-liquid and then allowed to react or foam up to form a relatively strong, rigid, light weight mass or body adhering to the adjacent surfaces. In the past, it has been the practice to provide the skins or structural metal parts with a suitable primer to obtain a good bond of the cellular plastic with the metal surfaces. Even where such primers are used there is a distinct tendency for the parts to fail at the bonds under bending and shear loads and in the case of sandwich type constructions there is often a peeling or delaminating action at the bonds between the metal and cellular plastic layers.

It is an object of the present invention to provide composite structures or parts having skins or other structural members of metal, or the like, and having poured in place cellular plastic cores or layers and which are characterized by simple, yet very effective means for materially increasing the strength of the structures or parts.

Another object of the invention is to provide structures or parts of this kind wherein a fabric, such as fibre-glass fabric, is secured to the inner surfaces of the metal members and the cellular plastic is applied or cast on the fabric to produce a resultant composite structure of great strength. We have found that the fabric suitably cemented on the inner surfaces of the metal parts greatly increases the bond strength of the cellular plastic, the plastic not only adhering to the fabric but also mechanically locking with the fabric by penetrating into the meshes of pores of the fabric while in the liquid or semi-liquid condition to be locked therein when set and cured. Additionally, the fabric, being in effect cast or embedded in the outer stratum of the cellular plastic, actually increases the strength of the core. Because of these factors or advantages the product or part has greatly increased overall strength and is very resistant to delamination.

Other objectives and features of the invention will become apparent from the following detailed description of typical preferred embodiments throughout which reference will be made to the accompanying drawings wherein:

Figure 1 is a cross sectional view of a sandwich type structure or part produced in accordance with the invention;

Figure 2 is a fragmentary perspective view of the part illustrated in Figure 1 with one edge broken away in a manner to illustrate the several members of the composite part;

Figure 3 is a sectional view of an aircraft surface made in accordance with the invention; and Figure 4 is a cross sectional view of a propeller or rotor blade made in accordance with the invention.

The present invention is capable of embodiment in devices, structures, and parts of widely different natures and while we have illustrated several typical embodiments of the invention, these are not to be construed as limiting the field of usefulness. In Figures 1 and 2, we have shown a sandwich type construction of the invention, in Figure 3 there is illustrated a tab, aileron, or similar aircraft surface made in accordance with the invention, and in Figure 4 we have shown a section of a propeller or rotor blade incorporating the structure of the invention.

Referring to Figures 1 and 2, the sandwich type part or structure includes outer members or skins 10, a core or inner layer 11 of cellular plastic, and bonding sheets 12 of fabric on the inner surface of the skins.

In accordance with the invention the skins 10 may be constructed of metal, wood, plywood, plastic, or combinations of such materials. Furthermore, one skin 10 may be of metal and the other may be of plywood, or other material. In many instances the skins 10 will be sheets or plates of metal, such as aluminum alloy, and it may be considered that the particular sandwich structure or panel illustrated in the drawings incorporates such skins. In aircraft applications the skins 10 may be anodized and in any event their inner surfaces are appropriately cleaned prior to assembling or fabricating the panel. While we have shown the skins 10 as spaced parallel parts, it is to be understood that they may be in any selected or required relationship.

The inner layer or core 11 is cast or poured in place and is in the nature of a body or layer of foamed or cellular plastic. It is preferred to employ a cellular plastic having good physical strength characteristics such as the alkyd resin-meta-toluene diisocyanate plastics described in the copending applications of Eli Simon and Frank W. Thomas, Serial Number 77,058 filed February 17, 1949 now U. S. Patent No. 2,591,884 and Serial No. 50,007 filed September 18, 1948, now U. S. Patent No. 2,577,280, or the Cellular Phenolic Plastic described in the copending application of Frank W. Thomas and Eli Simon, Serial No. 231,673 filed June 14, 1951. These and similar materials are made by preparing a reactant liquid or semi-liquid mixture which may be poured in place, applied by blades or trowels, or otherwise applied, and then allowed to react and foam up to constitute a cellular adherent mass that becomes rigid upon setting and curing. It is desirable to use a cellular material such as above described that has a multiplicity of substantially uniformly shaped and proportioned generally spherical cells and one that is physically strong and yet of relatively low density. These materials have the characteristic attribute of adhering to other materials of practically all kinds and of retaining this adhesion although, as above pointed out, the direct bond or adhesion of such materials to metal and the like is not as strong and reliable as could be desired for many installations, devices, or uses.

The layers or sheets 12 of fabric are provided between the skins 10 and the core 11, that is they cover the inner surfaces of the skins. While the sheets 12 may be made from any selected or suitable fabric, it is preferred to employ sheets of fibre-glass cloth. This cloth is strong, is substantially unaffected by any chemical action that may take place, and does not deteriorate with age. The cloth sheets or layers 12 are arranged to closely conform with the inner surfaces of the skins 10 and in accordance with the invention are secured thereto. A suitable cement or adhesive C, such as a solvent solution of a Buna-N-phenolic adhesive, or any equivalent cement, may be employed to fix or secure the fabric to the skins. In applying the sheets 12 the cement or adhesive C is preferably first spread on the surfaces of the skins 10 and while the adhesive remains tacky or partially wet, the dry sheets 12 are pressed thereon. With this mode of applying the fabric sheets 12 the fabric does not become impregnated or clogged with the cement and the surfaces of the fabric which face away from the skins 10 are left dry and with their pores or meshes open for the reception of the liquid or semi-liquid reactant plastic mixture. The plastic mixture after it has set and hardened thus has direct adhesion to the fabric and is mechanically interlocked with the fibers and threads of the cloth.

In Figure 3, the skin 110 of the aerodynamic or airplane surface S has a layer or sheet of fabric 112 on its inner surface. This fabric 112 may be the same as the fabric 12, described above, and is cemented to the skin 110 in the same manner. The core 111 of cellular plastic is poured in the part after the fabric 112 has been cemented on the skin 110 and adheres and mechanically interlocks with the fabric. While we have shown the core 111 completely occupying the part or surface S, it is to be understood that it may be cored or otherwise formed to have internal spaces or to receive other members. In Figure 4, the skin 210 of the generally airfoil shaped blade or rotor is provided on its inner surface with a layer or covering of fabric 212. This fabric 212 may be fibre-glass cloth and is directly cemented on the internal surface of the skin. The core 211 of the blade is a cellular plastic such as above described, and is formed by pouring or otherwise introducing the liquid reactant plastic mixture into the hollow blade to react therein and directly adhere to and interlock with the dry unclogged internal surface of the fabric 212.

It is to be understood that the fabric 12, 112 and 212 may be of any selected or desired thickness or coarseness. In the drawings the thickness and mesh or coarseness of the fabric have been exaggerated for the sake of clarity as has been the thickness of the layers of adhesive or cement C in Figures 1 and 2.

Having described only typical forms of the invention we do not wish to be limited to the specific details herein set forth but wish to reserve to ourselves any variations or modifications that may appear to those skilled in the art and fall within the scope of the following claims.

We claim:

1. The method of making an aircraft control surface and the like comprising the steps of shaping the sheet metal skin to form a hollow member of the desired external contour, applying a liquid cement to the internal surface of said skin, pressing a fibre-glass cloth fabric onto the liquid cement in a manner to secure said fabric to said skin leaving the inward-facing side of said fabric dry and substantially cement-free, drying said liquid cement to securely bond one side of said fabric to said skin, pouring a reactant plastic mixture into the hollow member which foams in place to fill said hollow member and which penetrates the dry face of said fabric lining the hollow member to adhere to the fibres of said fabric and mechanically interlock therewith to form a unitary structure.

2. The method of internally strengthening a hollow-formed sheet metal member comprising the steps of forming said hollow member from a metal sheet, cementing one side only of a fabric to the internal surface of said hollow member so that the other side of said fabric is dry and substantially cement-free, curing the cement to securely bond the fabric to the inside surface of said hollow member, pouring a reactant plastic mixture into the hollow member which foams in place to fill the cavity in the hollow member and penetrate the interstices of the dry face of the fabric to adhere to and mechanically interlock with the fibres of said fabric face.

3. The method of internally strengthening a hollow-formed sheet metal structure having spaced, opposed sheet metal skin portions, which comprises the steps of applying a liquid cement to the inner faces of said metal skin portions, pressing a fabric onto the cement-coated faces of said skin portions in a manner that leaves the opposite side of said fabric dry and substantially cement-free, curing said cement to bond one side of said fabric securely to said skin portions, pouring a reactant plastic mixture into the space between said skin portions which foams in place to fill said space and penetrates the interstices of said dry face of said fabric to adhere to and mechanically interlock with the fibres of said fabric to form a unitary structure.

4. An aircraft structure comprising a sheet metal skin shaped to form a hollow member of the desired external contour, a fibre-glass cloth layer lining the internal surface of said sheet metal skin, a cement layer securing one face only of said fibre-glass cloth layer to said skin, a cast-in-place core of foamed in situ reactant plastic mixture filling the said hollow member adhered to and mechanically interlocked with the inner face of said fabric layer to form a unitary structure.

References Cited in the file of this patent

UNITED STATES PATENTS

| | | |
|---|---|---|
| 1,372,478 | Bradley | Mar. 22, 1921 |
| 1,507,143 | Toussaint | Sept. 2, 1924 |
| 1,549,320 | Lundin | Aug. 11, 1925 |
| 1,769,005 | Van Dusen | July 1, 1930 |
| 1,802,985 | Semon | Apr. 28, 1931 |
| 1,885,364 | Lewis | Nov. 1, 1932 |
| 2,068,533 | Coffman | Jan. 19, 1937 |
| 2,329,366 | Weill et al. | Sept. 14, 1943 |
| 2,377,846 | Dreyful | June 5, 1945 |
| 2,414,125 | Rheinfrank | Jan. 14, 1947 |
| 2,446,429 | Nelson | Aug. 3, 1948 |
| 2,461,761 | Nye | Feb. 15, 1949 |
| 2,484,141 | Alex | Oct. 11, 1949 |
| 2,504,421 | Johnson et al. | Apr. 18, 1950 |
| 2,552,641 | Morrison | May 15, 1951 |
| 2,566,701 | Griese | Sept. 4, 1951 |
| 2,576,073 | Kropa et al. | Nov. 20, 1951 |
| 2,602,783 | Simon et al. | July 8, 1952 |
| 2,628,654 | Alderfer | Feb. 17, 1953 |
| 2,629,678 | Thompson et al. | Feb. 24, 1953 |
| 2,655,459 | Gordon et al. | Oct. 13, 1953 |